Feb. 10, 1925.
F. W. STERLING
1,525,832
SUN AND RAIN SHIELD FOR MOTOR VEHICLES
Filed Dec. 17, 1921    2 Sheets-Sheet 1
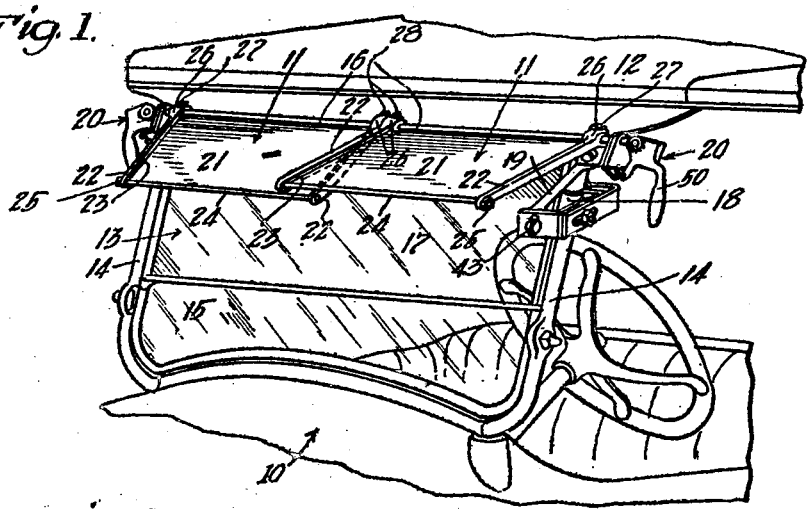
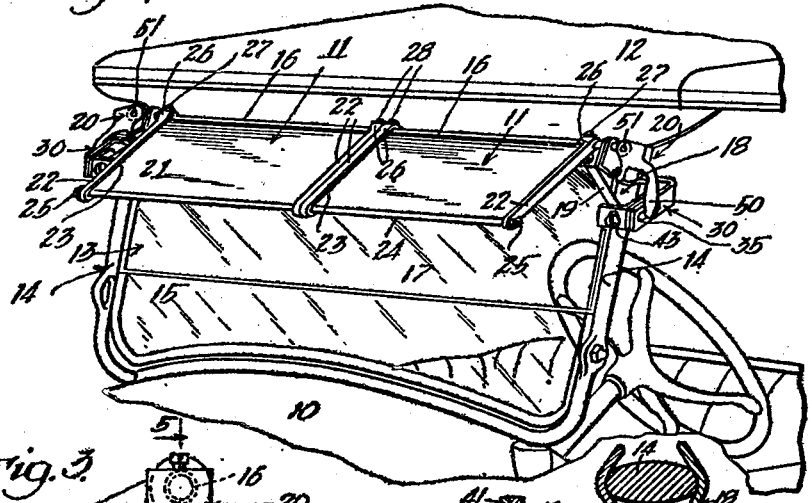
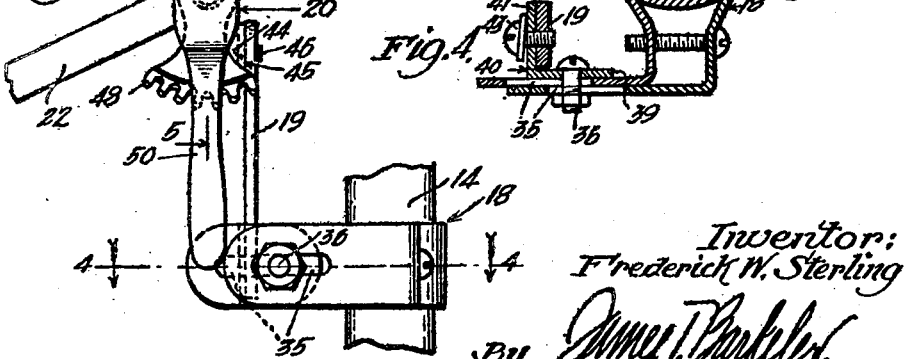
Inventor:
Frederick W. Sterling
By James T. Barkeler
his Attorneys Feb. 10, 1925.
F. W. STERLING
SUN AND RAIN SHIELD FOR MOTOR VEHICLES
Filed Dec. 17, 1921    2 Sheets-Sheet 2

Inventor:
Frederick W. Sterling,
By James T. Barkeley
his Attorney

Patented Feb. 10, 1925.

1,525,832

UNITED STATES PATENT OFFICE.

FREDERICK W. STERLING, OF LOS ANGELES, CALIFORNIA.

SUN AND RAIN SHIELD FOR MOTOR VEHICLES.

Application filed December 17, 1921. Serial No. 523,176.

*To all whom it may concern:*

Be it known that I, FREDERICK W. STERLING, a citizen of the United States, residing at Los Angeles, in the county of Los Angeles and State of California, have invented new and useful Improvements in Sun and Rain Shields for Motor Vehicles, of which the following is a specification.

This invention relates to a sun and rain shield to be attached to the windshield of a motor vehicle and it is an object of the invention to provide an effective, improved, sightly device of this character.

A distinctive feature of this invention is the provision of a device of the character specified having two shields or shield parts which, together, form a shield for the entire windshield and are independently adjustable. The two shield parts being independently adjustable can be set so that they exactly suit the requirements of both persons sitting behind the windshield. It is desirable that the parts of the shield should be independently adjustable as it often occurs that two persons sitting behind the windshield require or desire different adjustments of the sun and rain shield. Further, the shield being formed in two independently adjustable parts can be easily and conveniently adjusted by adjusting the parts separately.

Another noteworthy feature of the invention is the means provided for mounting the shield structure on a windshield. The mounting means is of simple, inexpensive construction and is adjustable so that the device can be properly mounted on windshields of various widths, can be mounted at various heights on a wind-shield, and can be mounted various distances from or in front of a windshield.

The various objects and features of the invention will be best and more fully understood from the following detailed description of a typical, preferred form of the invention throughout which reference is had to the accompanying drawings, in which:—

Figure 5:
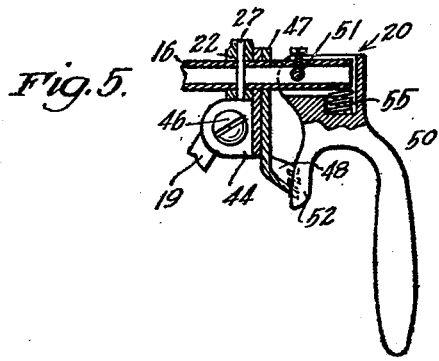
Figure 6:
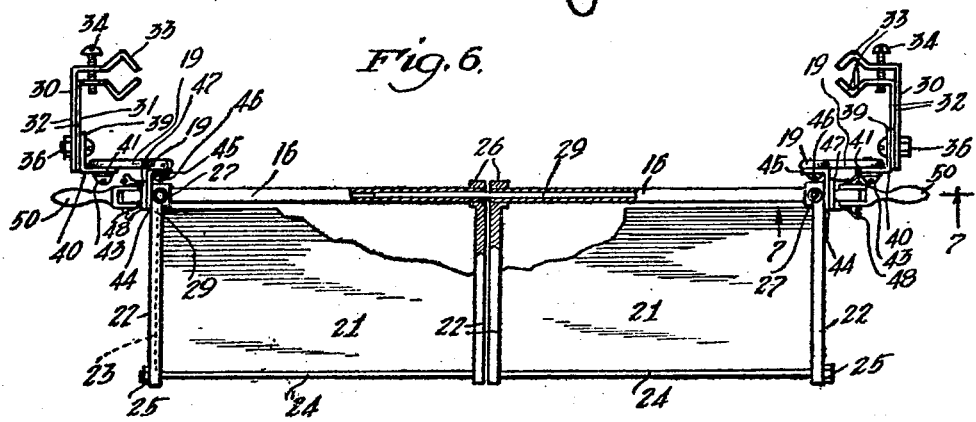
Figure 8:
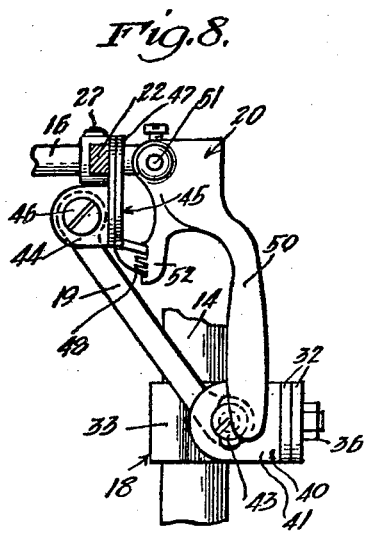
Figure 7:
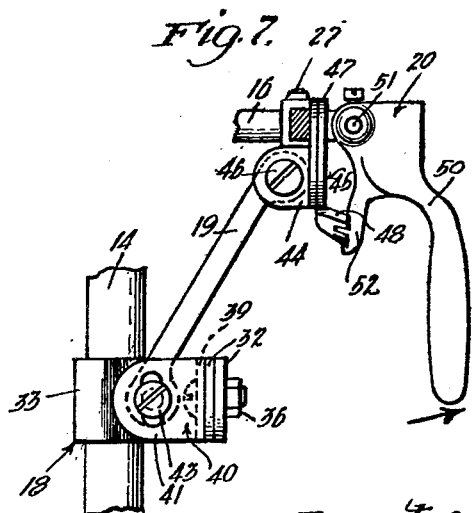

Fig. 1 is a perspective view of a portion of a typical motor vehicle showing particularly the windshield thereof and showing the sun and rain shield provided by the present invention in connection with the windshield and with its two shield parts adjusted differently, or, so that the two sides of the windshield are differently shaded or shielded; Fig. 2 is a view similar to Fig. 1 showing the device provided by the present invention with the shield parts adjusted alike so that all parts of the wind shield are shaded or shielded the same; Fig. 3 is an enlarged end elevation of the device provided by the present invention; Fig. 4 is a detailed sectional view taken as indicated by line 4—4 on Fig. 3; Fig. 5 is an enlarged detailed sectional view taken as indicated by line 5—5 on Fig. 3; Fig. 6 is a plan view of the device provided by the present invention, parts thereof being broken away to show in section; Fig. 7 is an enlarged view taken as indicated by line 7—7 on Fig. 6 showing the positioning of the various parts of the device when it is mounted on a narrow windshield and; Fig. 8 is a view similar to Fig. 7 showing the positioning of the several parts when the device is mounted on a wide windshield.

Throughout the drawings numeral 10 designates the body of the motor vehicle, numeral 12 the top thereof, and numeral 13 the windshield which extends upwardly from the body 10 to the front portion of the top 12. The windshield 13 which I illustrate in the drawings is of typical construction and comprises, generally, standards 14 which extend upwardly from opposite sides of the body 10, a lower panel 15 pivotally mounted between the lower portions of the standards 14, and an upper panel 17 pivotally mounted between the upper portions of the standards 14. The particular arrangement and construction of the various parts of the motor vehicle herein described is merely intended as typical of present day practice and is set forth simply for illustrating the general application of the device provided by the present invention.

The device provided by the present invention comprises, generally, two shields 11, rods 16, which carry the shields 11, clamps 18 to be attached to the standards 14 of the windshield 13, arms 19 connecting the clamps 18 and rods 16, and adjusting mechanisms 20 in connection with the rods so that they can be rotated to change the angular positions of the shields 11. Each shield 11 comprises a panel 21, preferably of suitably colored or treated glass or the like, carried between two spaced arms 22 which are mounted on and extend outwardly from the rod 16. The arms 22 may be formed with grooves 23 to receive the ends of the panel 21 and their outer ends may be connected or tied together by a rod 24 extending between them and lying at and extending parallel to the outer edge of the panel 21. The rod 24 may screw thread into the end portion of the arm 22 carrying the inner end of the panel 21, may extend freely through an opening in the end portion of the arm 22 carrying the outer end of the panel, and may have a clamping nut 25 screw threaded on its outer end, as clearly illustrated in Fig. 6 of the drawings. The rod 24 is particularly effective in holding the arms 22 together so that the panel 21 cannot become displaced from between them and makes for a particularly neat, sightly device in that it may be comparatively small and is arranged at the edge of the panel 21 where it is not conspicuous. Although the arms 22 may be connected to the rod 16 in various manners it is preferred that they be formed at their inner ends with enlarged parts 26 having bores to receive the rod 16. One of the arms, preferably the one carrying the outer end of the panel 21, is fixed on the rod 16 by a pin 27 extending through its enlarged part 26 and through the rod 16. The other arm 22 is adapted to be set on the rod by a set screw 28, carried by its enlarged part 26.

In practice the arm 22 carrying the outer end of the panel is set on the outer end portion of the rod 16 so that the arm 22 carrying the inner end portion of the rod is at the extreme inner end of the rod 16 when the panel 22 is in place between the two arms. The two rods 16 carrying the shields 11 are preferably hollow or tubular members and are connected or held concentrically by a pin 29 tightly carried in the inner end portion of one of them so that it extends more or less freely into the inner end portion of the other. This manner of connecting the inner ends of the rods 16 is particularly simple, effective and allows the two rods 16 and therefore the shields 11 to be turned relative to each other, and allows the rods 16, and therefore the shields 11, to be completely detached or separated when desirable or necessary, as for instance for shipment, convenience in handling before being installed, etc.

Each clamp 18 comprises two clamp parts 30 and 31 having body parts 32 and jaw parts 33. The jaw parts 33 of the clamp members are oppositely disposed so that they co-operate to grip a windshield standard and are adapted to be held or clamped together by suitable clamping screws 34. The body parts of the clamp members are disposed relative to the jaw parts so that they are in engagement with each other and extend forwardly from the windshield standard when the jaws are clamped on the standard. The body parts of the clamp members are formed with registering slots 35 which carry a bolt 36 and allow the bodies to move relative to each other during the clamping or releasing of the jaws 33. The bolt 36 acts to clamp the body parts of the clamp members together and to pivotally attach the arm 39 of an angular bracket member 40 to the clamp mechanism. The bracket 40 has an arm 41 extending from the arm 39 in a direction transverse of the windshield 13. The bracket 40 being pivotally connected to the clamp mechanism by the bolt 36 can be turned or rotated so that the arm 41 lies in any desired plane.

The lower end of each arm 19 is pivotally connected to the arm 41 of one of the brackets 40 by a screw member 43 which extends through an opening in the arm 41 and screw threads into the lower end portion of the arm 19. The upper end of each arm has attached to it the flange 44 of a bracket 45 which carries or supports a rod 16. The connection between the flange 44 and upper end of the arm 19 is effected by a screw member 46 extending parallel to the screw member 43, through an opening in the flange 44 and screw threads into the upper end portion of the arm 19.

Each bracket 45 has a body part 47 formed with an opening which rotatably carries the outer end portion of a rod 16, and has a notched segment 48 concentric with the opening which carries the rod 16. The bracket 45 supports the rod 16 immediately outward of the arm 22 which supports the outer end of the panel 21.

An operating member or handle 50 is pivotally mounted on the outer end portion of each rod 16 outward of the bracket 45. Each handle 50 is pivotally mounted on the end of the rod 16 by a pivot pin 51 and is formed with a projection 52 adapted to engage and cooperate with the notches in the segments 48 to positively hold the rod 16 against rotation relative to the bracket 45. Each handle 50 is arranged and proportioned so that it can be conveniently operated by a person seated behind the vehicle windshield 13. A spring 55 is arranged in connection with each handle 50 to normally yieldingly hold it in position where its projection 52 extends into and cooperates with one of the notches in the segment making it necessary to positively swing the handle out in the direction indicated by the arrow in Fig. 7 before it can be moved to cause movement or adjustment of the rod 16. The particular adjusting mechanism just described is more fully set forth and is claimed in my co-pending application entitled Sun and rain shield for motor vehicles Serial No. 464,159, filed April 25th, 1921.

In practice the clamp mechanisms 18 are set or clamped to the windshield standards 14 at the desired height and the brackets 40, carrying the arms 19, are turned or adjusted about the screw members 36 until the rods 16 are in the desired position relative to the upper portion of the windshield 13, and the arms 19 are swung about the screw members 43 and 46 so that the inner ends of the shields 11 are together and so that the shield structure is centrally located relative to the windshield B. When the various parts have been properly adjusted or positioned the screw members which allow them to be thus adjusted are tightened so that they are firmly held in the proper adjusted positions. From inspection of the drawings it will be obvious how adjustment of the brackets 40 about the screw members 36 will enable the rods 16, or the inner edges of the shields 11, to be spaced the desired amount from the upper portion of the windshield 13, or to be positioned at the upper portion of the windshield 13, and how the adjustments of the arms 19 about the screw members 43 and 46, permit of the arms being swung to various positions such as are illustrated in Figs. 7 and 8, to permit of the inner ends of the shield 11 being arranged together and of the shield structure being located centrally relative to the windshield 13. In Fig. 1 of the drawings I have shown the device mounted on a comparatively narrow windshield while in Fig. 2 I have shown the device mounted on a comparatively wide windshield. From inspection of these two figures of the drawings it will be obvious how the mounting means or mechanism provided by the invention makes the device applicable to windshields of various widths. This is a particularly important feature commercially as it makes it unnecessary to manufacture numerous sizes of shields, etc. to accommodate windshields of various widths.

When the device has been properly mounted on or attached to a windshield the two shields 11 can be independently adjusted by suitable manipulation of the handles 50 and can be either set together as illustrated in Fig. 2 to form an even sun and rain shield across the entire windshield or can be adjusted differently as illustrated in Fig. 1 so that they shade and shield different parts of the windshield 30 indifferently.

From the foregoing description it will be obvious that the mounting means or brackets that is the clamp 18, arm 19, brackets 40 and 45, etc., provided by the invention may be used in supporting or carrying shields of various forms and constructions without departing from the spirit of the invention. For instance, although I have set forth a two part shield structure as being supported by the brackets I do not mean to limit the use of the brackets to this specific type of shield structure but intend that they are to be applicable to supporting all types and constructions of shields of this general character, including, for instance, continuous shield extending completely across the windshield, shields extending only partially across the wind shield, shields of metal, shields of glass, or the like, etc.

Having described only a preferred form of my invention I do not wish to limit myself to the particular details hereinabove set forth but wish to reserve to myself any changes or variations that may appear to those skilled in the art and that may fall within the scope of the following claims.

Having described a preferred form of my invention, I claim:—

1. In combination with a vehicle wind shield, a sun and rain shield device comprising, a shield, a support for the shield, and brackets mounting the support across the wind shield, each bracket comprising a clamp device engaging the wind shield, a bracket mounted on the clamp to be adjustable about an axis longitudinal of the windshield, an arm mounted on said bracket to be adjustable about an axis transverse of the windshield, and a second bracket mounted on the arm to be adjustable about an axis transverse of the windshield and carrying the end portion of the support.

2. In combination with a vehicle wind shield, a sun and rain shield device comprising, a shield, a support for the shield, brackets mounting the support across the wind shield, each bracket comprising a clamp device engaging the wind shield, a bracket mounted on the clamp to be adjustable about an axis longitudinal of the windshield, an arm mounted on said bracket to be adjustable about an axis transverse of the windshield, and a second bracket mounted on the arm and rotatably carrying the end portion of the support, a notched segment in connection with the last mentioned bracket, and a handle member pivotally mounted on the end portion of the support adapted to be operated to cause rotation of the rod and having a part adapted to cooperate with the notches of said segment to hold the support against rotation.

3. In combination with a vehicle, a sun and rain shield device comprising, two hollow rods arranged end to end, a member carried in the rods to hold them in alignment and allow them to be relatively rotatable, shields mounted end to end on the rods, means mounting the rods on the wind shield each comprising, a clamp device engaging the wind shield, a bracket mounted on the clamp to be adjustable about an axis longitudinal of the wind shield, an arm mounted on said bracket, to be adjustable about an axis transverse of the windshield, and a second bracket mounted on the arm to be adjustable about an axis transverse of the windshield and rotatably supporting the end portion of a rod, a notched segment in connection with each of the said second brackets, and handles pivotally mounted on the ends of the rods adapted to be operated to cause rotation of the rods, and having parts adapted to cooperate with the notched segments to hold the rods against rotation.

In witness that I claim the foregoing I have hereunto subscribed my name this 28th day of November, 1921.

FREDERICK W. STERLING.

Witness:
VIRGINIA BERINGER.